July 10, 1956 W. C. BOWYER 2,753,923
FLUID PRESSURE ACTUATED TIRE BEAD LOOSENING TOOL
Filed Jan. 22, 1953 2 Sheets-Sheet 1
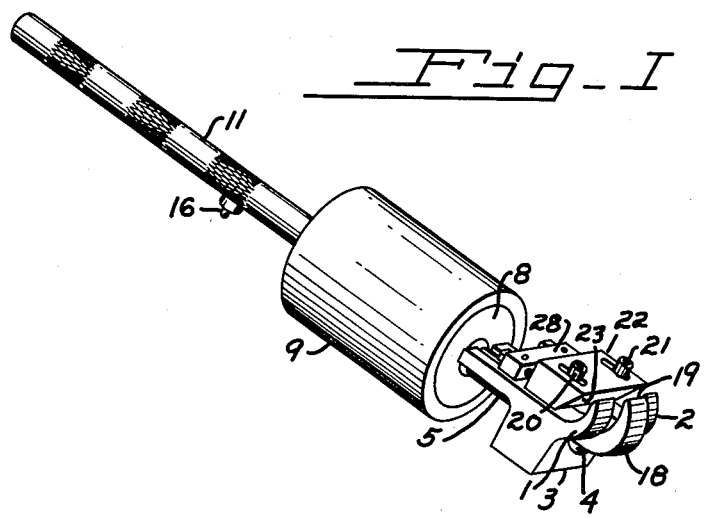
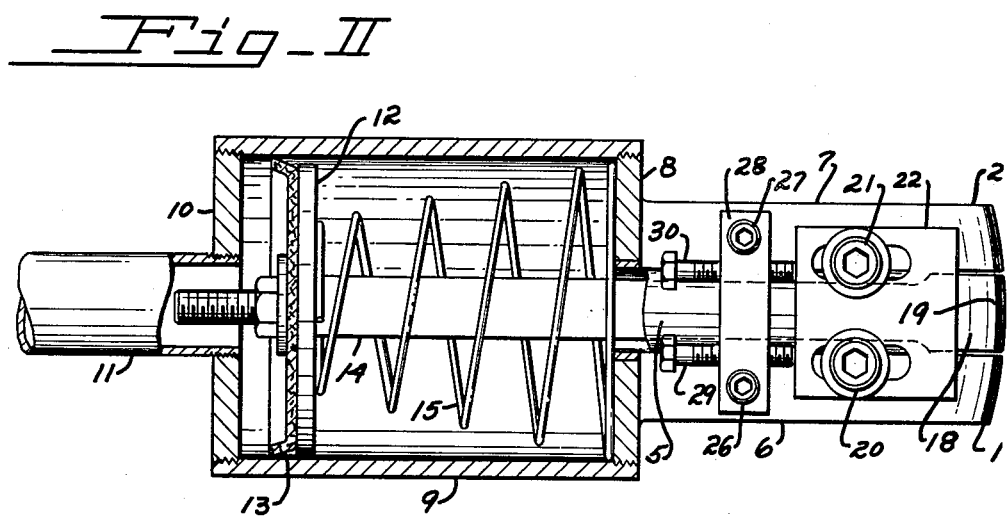
Inventor
WILLIAM C. BOWYER
By
Marshall, Marshall & Heasting
Attorneys July 10, 1956  W. C. BOWYER  2,753,923
FLUID PRESSURE ACTUATED TIRE BEAD LOOSENING TOOL
Filed Jan. 22, 1953  2 Sheets-Sheet 2
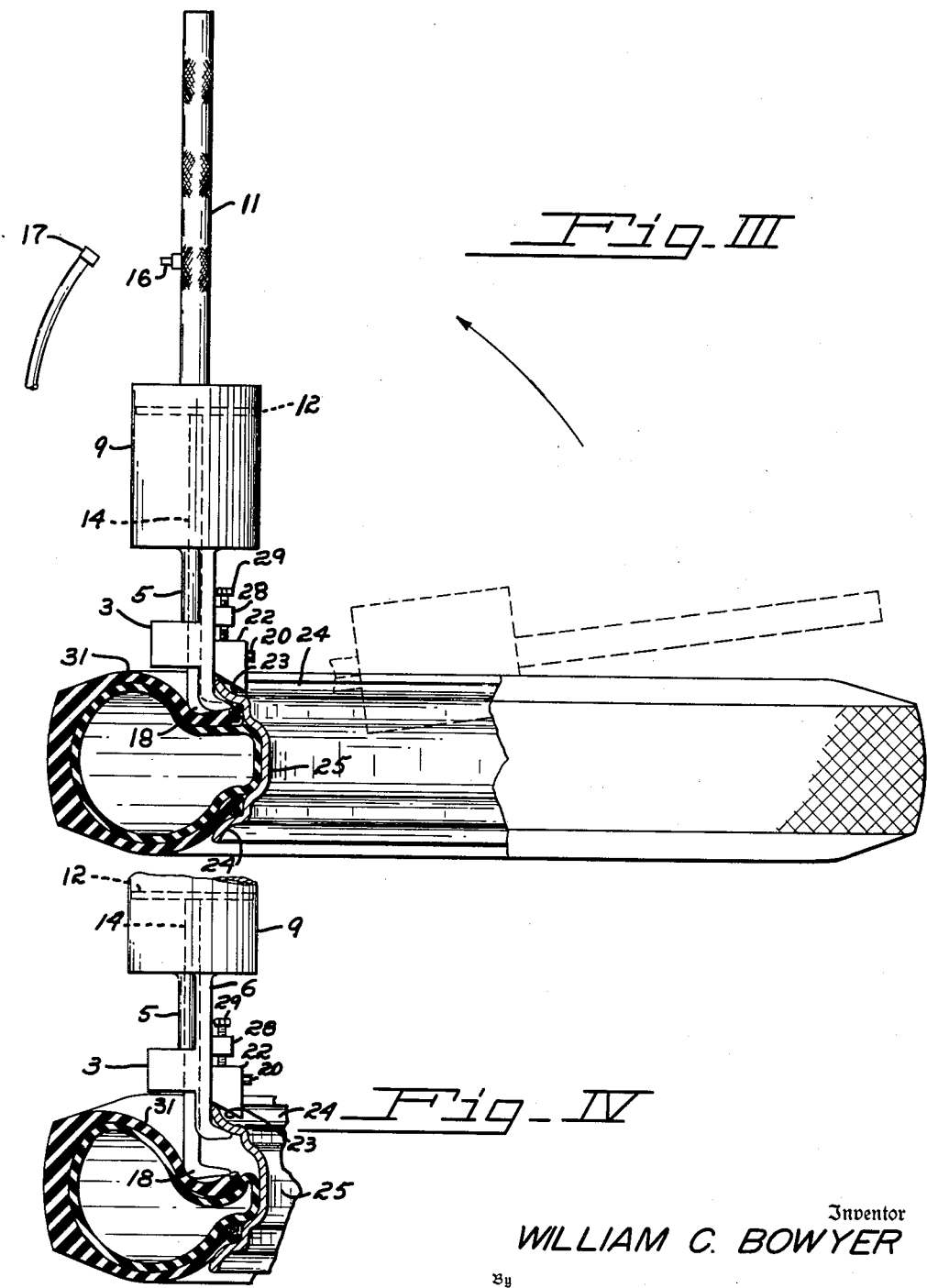
Inventor
WILLIAM C. BOWYER

United States Patent Office 2,753,923
Patented July 10, 1956

2,753,923

FLUID PRESSURE ACTUATED TIRE BEAD LOOSENING TOOL

William C. Bowyer, La Porte, Ind.

Application January 22, 1953, Serial No. 332,605

2 Claims. (Cl. 157—1.17)

This invention relates to tire dismounting devices and particularly to devices of the kind in which a pair of claws are devised to be hooked under the flange of a rim upon which a tire is mounted, and in which a pressure foot then is forced against the bead and side of the tire casing to separate the bead and side of the tire casing from the flange and rim.

Huge tire casings such as are used on trucks, buses, tractors and airplanes are very heavy and stiff, and after weeks or months of service, corrosion of the rims and flanges engaged by the beads of the casings, and heat generated by the flexing of the inflated tires and by friction on road surfaces, as well as heat transmitted from brake drums, often cause the casings to adhere to the rims almost as tenaciously as though they were purposely vulcanized in place.

When it becomes necessary to dismount such a casing for repair or replacement, great force is required to loosen the casing from the flange and the adjacent portion of the rim. If such force is applied haphazardly, as by means of a sledge hammer or a poorly designed tool, the rim or the casing, or both, are liable to be damaged.

It is an object of this invention to provide a tire dismounting device adapted to utilize force applied by compressed air, such as is available in nearly all shops where tires are worked upon.

It is a further object to provide a tire dismounting device having a pair of claws combined with means to facilitate driving such claws between the flange of a wheel rim and a tire casing.

Another object is to provide a tire dismounting device having a pair of claws and a pneumatically operated pressure foot movable from a position between said claws and having a toe shaped to conform to the shape of the claws, the claws and the toe being combined with means to facilitate driving them between the flange of a wheel rim and a tire casing.

Still a further object is to provide a tire dismounting tool having a pair of claws adapted to be inserted between the flange of a wheel rim and a tire casing, the tool having a guard member extending laterally for a distance exceeding the distance from claw to claw and adapted to be locked in adjusted position against the side of the flange opposite that engaged by the claws to prevent the claws from accidentally slipping from between the flange and casing.

Still another object is to provide a tire dismounting tool having the characteristics set forth in the preceding statements and which nevertheless can be conveniently shifted around the periphery of a wheel rim to loosen one section of a tire casing after another.

Other objects and advantages will be apparent from the following description, reference being had to the accompanying drawings:

Figure I is a view in perspective of a tire dismounting device embodying the instant invention.

Figure II is an enlarged view of one end of the tire dismounting device, a pneumatic cylinder being shown in section.

Figure III is a side elevational view of a tire dismounting device of the invention showing the manner of engaging it with a tire and rim, shown partly in section.

Figure IV is an elevational view of one end of the tire dismounting device showing the manner in which it separates a portion of a tire from a rim, fragments of the tire and rim being shown in section.

The tire and rim engaging portion of the device comprises a pair of claws 1 and 2, integral with which is an anvil 3. Opening through the anvil 3 and extending between the claws 1 and 2 is a channel 4 leading to a cylindrical housing 5 which lies along the shanks 6 and 7 of the claws 1 and 2. The claws 1 and 2, the anvil 3, the housing 5 and the shanks 6 and 7 may be forged from one piece, or the anvil 3 and the housing 5 may be formed separately and welded to the shanks 6 and 7.

Secured to the housing 5 and the shanks 6 and 7, by welding or otherwise, is the base 8 of a cylinder 9, the top 10 of which has an opening into which is threaded a pipe 11. The cylinder 9 contains a plunger 12 which carries a cupped washer 13 adapted to prevent excessive leaking of compressed air around the plunger 12. The plunger 12 is fixed upon a ram 14 which is surrounded by a spiral expansive spring 15 that holds the plunger 12 adjacent the top 10 of the cylinder 9 except when the plunger 12 is forced toward the base 8 of the cylinder by compressed air admitted through the pipe 11.

The outer end of the pipe 11 is closed and the pipe is provided with a valveless fitting 16 adapted to be engaged by a standard fitting 17 such as that with which an air hose in garages or tire shops customarily is equipped. Whenever the air hose fitting 17 is applied to the valveless fitting 16 of the pipe 11, the plunger 12 is pushed by air pressure toward the base 8 of the cylinder 9.

Formed at the end of the ram 14 is a pressure foot 18, the toe 19 of which lies between the claws 1 and 2 when the plunger 12 is in its position nearest the top 10 of the cylinder 9. The toe 19 of the pressure foot 18 conforms in shape to the claws 1 and 2, all of them having chisel like ends which lie on a circle having its center at the axis of the tool, to fit the curvature of the smallest rims. If the tool fits the curvature of small rims it also will accommodate large rims satisfactorily.

Slidably mounted on the pair of socket headed screws 20 and 21 which are threaded into the shanks 6 and 7 is a guard 22 having a beveled front 23 to overlie the flange 24 of a wheel rim such as 25. Secured by means of screws 26 and 27 to the shanks 6 and 7 is a bar 28, through which are threaded set screws 29 and 30 by means of which the slidably mounted guard 22 may be positioned to accommodate rims of various thicknesses and shapes.

Operation

When it is desired to separate a tire casing from the flange and adjacent portion of a rim, the chisel like edges of the claws 1 and 2 and the toe 19 may be driven between the side of the tire casing such as 31 and the flange 24 of a rim 25 by holding the tire dismounting device in the position indicated by dash lines in Figure III and striking the anvil 3, preferably with a heavy rubber mallet. Since the guard 22 extends along the flange from claw to claw, the flange is reliably held between the claws and the guard, so that the flange may be used as a fulcrum about which the device may be pivoted into the position in which it is shown in full lines in Figure III. If, while it is in this position, the fitting 17 of an air hose is applied to the valveless fitting 16 in the pipe 11, air pressure forces the plunger 12, the ram 14 and the pressure foot 18 downwardly, thus separating the bead of the tire casing 31 from the rim 25 in the manner indicated in Figure IV. With a plunger 12 having a diameter of 5½ inches, for example, and with air pressure of 160 pounds per square inch or more, the pressure foot 18 will be forced against the side wall of the casing with a force of some 3,000 pounds or more.

When the air hose fitting 17 is removed from the valveless fitting 16 in the pipe 11, the spring 15 forces the plunger 12 and the ram 14 toward the top 10 of the cylinder 9 and moves the pressure foot 18 back to its initial position between the claws 1 and 2. The claws 1 and 2 and the guard 22 then may be slid around the flange 24 to a new position, or the device may be swung downwardly into the position indicated by dashed lines in Figure III, whereupon the claws may be unhooked from the flange 24, applied at a new location and driven between the flange and the tire casing, again using the anvil 3 and a heavy rubber mallet.

Having described the invention, I claim:

1. In a tire bead manipulating tool, in combination, a body member having a pair of spaced claws fixed thereto, and having an extended surface transverse to said claws, a guard member adjustably mounted for movement along said surface, means for guiding the movement of said guard member in a path toward and away from said claws, means for securing said guard member in adjusted position relative to said body member, said guard member having a face inclined inward toward said surface of said body member and forming therewith a generally V-shaped bight that is partially closed by said claws, for the reception of a flange of a tire rim, said body member having a guideway therealong in communication with the space between said claws, a fluid pressure cylinder mounted on said body member in alignment with said guideway, a piston mounted in said cylinder, a piston rod joined to said piston and extending through said guideway, a claw joined to said piston rod and positioned between and similar in contour to said spaced claws, and means for admitting fluid under pressure to said cylinder to depress the claw joined to said piston rod.

2. In a tire bead manipulating tool, in combination, a body member having a pair of spaced claws fixed thereto, and having an extended surface transverse to said claws, a guard member adjustably mounted for movement along said surface, means for guiding the movement of said guard member in a path toward and away from said claws, an adjustable stop positioned to limit movement of said guard member away from said claws, means for securing said guard member in adjusted position relative to said body member, said guard member forming with said body member a bight that is partially closed by said claws, for the reception of a flange of a tire rim, said body member having a guideway therealong in communication with the space between said claws, a fluid pressure cylinder mounted on said body member in alignment with said guideway, a piston mounted in said cylinder, a piston rod joined to said piston and extending through said guideway, a claw joined to said piston rod and positioned between and similar in contour to said spaced claws, and means for admitting fluid under pressure to said cylinder to depress the claw joined to said piston rod.

References Cited in the file of this patent

UNITED STATES PATENTS

| | | |
|---|---|---|
| 1,233,012 | Ashbaugh et al. | July 10, 1917 |
| 1,519,558 | Snider | Dec. 16, 1924 |
| 1,983,608 | Hand | Dec. 11, 1934 |
| 2,581,086 | Edenfield et al. | Jan. 1, 1952 |
| 2,606,602 | Manupello | Aug. 12, 1952 |

OTHER REFERENCES

Popular Mechanics Magazine, June 1941, page 95.